US012656451B2

(12) United States Patent
George et al.

(10) Patent No.: US 12,656,451 B2
(45) Date of Patent: Jun. 16, 2026

(54) DIMENSIONALLY-TOLERANT, COMPACT, WIDEBAND, WAVEGUIDE-TO-MONOLITHIC MICROWAVE INTEGRATED CIRCUIT UPWARD VERTICAL TRANSITION

(71) Applicant: Aptiv Technologies AG, Schaffhausen (CH)

(72) Inventors: Roshin Rose George, Carmel, IN (US); Marlow Rumreich, Fishers, IN (US)

(73) Assignee: APTIV TECHNOLOGIES AG, Schaffhausen (CH)

( * ) Notice: Subject to any disclaimer, the term of this patent is extended or adjusted under 35 U.S.C. 154(b) by 373 days.

(21) Appl. No.: 18/521,238

(22) Filed: Nov. 28, 2023

(65) Prior Publication Data

US 2025/0172655 A1     May 29, 2025

(51) Int. Cl.
| | | |
|---|---|---|
| *H01Q 9/04* | (2006.01) | |
| *G01S 7/03* | (2006.01) | |
| *H01P 3/08* | (2006.01) | |
| *H01P 5/10* | (2006.01) | |
| G01S 13/931 | (2020.01) | |

(52) U.S. Cl.
CPC .............. *G01S 7/032* (2013.01); *H01P 3/08* (2013.01); *G01S 2013/93275* (2020.01)

(58) Field of Classification Search
CPC ............ H01Q 1/32; H01Q 9/04; H01Q 13/06; H01Q 21/00; H01Q 21/0037; H01Q 21/06; H01Q 21/064; H01Q 21/068; H01P 3/08; H01P 5/10; H01P 5/107; G01S 7/03; G01S 7/032; G01S 13/931
See application file for complete search history.

(56) References Cited

U.S. PATENT DOCUMENTS

| | | | | |
|---|---|---|---|---|
| 4,157,516 A | | 6/1979 | van de Grijp | |
| 4,901,040 A | * | 2/1990 | Ahlborn .................. | H01P 5/107 |
| | | | | 333/254 |
| 5,557,291 A | * | 9/1996 | Chu ...................... | H01Q 13/085 |
| | | | | 343/768 |

(Continued)

FOREIGN PATENT DOCUMENTS

DE          4136110 C1     12/1992

OTHER PUBLICATIONS

Extended European Search Report regarding European Patent Application No. 24198364.2, dated Mar. 3, 2025.

(Continued)

*Primary Examiner* — Tho G Phan
(74) *Attorney, Agent, or Firm* — Harness, Dickey & Pierce, P.L.C.

(57)          ABSTRACT

A radar sensor includes: a waveguide interface configured to contact a waveguide including a first aperture that is at least partially vertically aligned with a second aperture in the waveguide; a radio frequency (RF) feed; a first wing that is coplanar with the RF feed and the waveguide interface and that electrically connects the RF feed with the waveguide interface; a first electrically conductive layer that is connected to a ground potential, that includes a third aperture that is at least partially aligned with the first and second apertures, and that includes a second wing that forms a portion of the third aperture.

20 Claims, 13 Drawing Sheets

(56) References Cited

U.S. PATENT DOCUMENTS

| | | | | |
|---|---|---|---|---|
| 5,949,382 | A * | 9/1999 | Quan | H01Q 13/085 |
| | | | | 343/767 |
| 9,583,837 | B2 * | 2/2017 | Xue | H01Q 13/206 |
| 10,741,924 | B1 * | 8/2020 | McGrath | H01Q 5/30 |
| 12,244,081 | B2 * | 3/2025 | Khatua | H01Q 13/18 |
| 2021/0028537 | A1 | 1/2021 | Doyle et al. | |
| 2023/0243920 | A1 | 8/2023 | Aoki et al. | |

OTHER PUBLICATIONS

Sakakibara et al., "Broadband and Planar Microstrip-to-Waveguide Transitions in Millimeter-Wave Band," ICMMT 2008, Internal Conference on IEEE, XP031270741, dated Apr. 21, 2008.

Changpuak "Antipodal Vivaldi Antenna Designer" May 31, 2023; https://www.changpuak.ch/electronics/Antipodal_Vivaldi_Antenna_Designer.php.

Andrey Mozharovskiy, et al. "Wideband Tapered Antipodal Fin-Line Waveguide-to-Microstrip Transition for E-band Applications" Proceedings of the 43rd European Microwave Conference; 2013. pp. 1187-1190.

Benzerga Fellah et al. "Design of Antipodal Linearly Tapered Slot Antennas (ALTSA) Arrays in SIW Technology for UWB Imaging"; Laboratoire de Télécommunications, Faculté de Technolgie, Algeria; 2017.

Mohammad Mahdi Honari, et al. "Miniaturized Antipodal Vivaldi Antenna with Improved Bandwidth Using Exponential Strip Arrms" Electronics, 2021.

* cited by examiner

DIMENSIONALLY-TOLERANT, COMPACT, WIDEBAND, WAVEGUIDE-TO-MONOLITHIC MICROWAVE INTEGRATED CIRCUIT UPWARD VERTICAL TRANSITION

FIELD

The present disclosure relates to radar sensors and more particularly to waveguides and monolithic microwave integrated circuits (MMICs) of radar sensors.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Vehicles known are capable of determining their current position on the basis of at least one sensor mounted on the vehicle. For example, a vehicle may include a global-positioning system (GPS) from which the position of the vehicle can be inferred. The determination of the position by means of a GPS involves a radio signal from satellite space, which may, however, not always readily be available. For example, the GPS signal can be very weak so that a relatively long time span is used in order to evaluate the position from the signal. Sometimes, the signal is too weak in order to determine the position. In other circumstances, there is no signal available, for example, in fully or partially enclosed vicinities, such as road tunnels and buildings, such as subterranean garages. Without the GPS signal, no position can be determined. Accuracy of GPS may also not always be sufficient, for example for autonomous-driving applications.

Some vehicles may include radar and/or LiDAR (light detection and ranging) sensors. Measurements from such sensors, which may be referred to as scans, may be insufficient for determining the position with a target reliability and accuracy. The same problem may occur with one or more motion sensors mounted on the vehicle. Additionally, using radar sensors or other sensor technology may involve significant processing resources, for example due to determining radar detection points from the raw sensor data. The raw sensor data may be given as sensor data samples with a radial distance component and a rate of change of the distance (velocity in the radial distance direction). Such sensor data can be denoted as Doppler-sensor data.

There is a need to provide a dimensionally tolerant, compact, wideband, waveguide to monolithic microwave integrated circuit (MMIC) upward vertical transition in radar sensors.

SUMMARY

In a feature, a radar sensor includes: a waveguide interface that is electrically conductive, that is configured to contact a waveguide, and that includes a first aperture that is at least partially vertically aligned with a second aperture in the waveguide; a radio frequency (RF) feed that is electrically conductive; a first wing that is coplanar with the RF feed and the waveguide interface and that electrically connects the RF feed with the waveguide interface; a first electrically conductive layer that is electrically connected to a ground potential, that includes a third aperture that is at least partially aligned with the first and second apertures, and that includes a second wing that forms a portion of the third aperture, where the first wing extends away from a line through an axis of the RF feed in a direction toward a first surface of the first aperture, and where the second wing: extends away from the line toward a second surface of the first aperture that is opposite the first surface; and extends from the second surface further toward the first surface than a closest side of the RF feed to the first surface.

In further features, the first wing and the second wing are asymmetrical.

In further features, the first wing includes a tapered portion.

In further features, the tapered portion incudes at least one curve.

In further features, the second wing includes a convex portion and a concave portion.

In further features, the second wing includes at least two curved portions.

In further features, the second wing includes a linear portion that extends between the second surface toward the first surface to a point that is closer to the first surface than the closest side of the RF feed.

In further features, a substrate and a second electrically conductive layer are disposed on a first surface of the substrate, where the RF feed, the first wing, and the waveguide interface directly contact the second electrically conductive layer, and where the electrically conductive layer contacts a second surface of the substrate that is opposite the first surface.

In further features, the waveguide is included.

In further features, the waveguide includes an electrically conductive material on exterior surface of waveguide.

In further features, an electrically insulative material is disposed within the second aperture.

In further features, the waveguide interface is C-shaped and the RF feed extends into an opening in the C shape.

In further features, the first aperture is within the C shape.

In further features, electrically conductive vias electrically connect the first electrically conductive layer to the ground potential.

In further features, a third electrically conductive layer is electrically connected to the ground potential, where the electrically conductive vias electrically connect the first electrically conductive layer to the third electrically conductive layer.

In further features, the third electrically conductive layer includes a first electrically conductive portion, a second electrically conductive portion, and an electrically insulative portion that electrically isolates the first electrically conductive portion from the second electrically conductive portion.

In further features, the first electrically conductive portion is disposed within the second electrically conductive portion, and where the electrically conductive vias electrically connect the first electrically conductive layer to the first electrically conductive portion.

In further features, a second substrate is disposed between the first electrically conductive layer and the third electrically conductive layer.

In further features, the line through the axis of the RF feed is perpendicular to second axes of the first and second apertures.

In further features, the second wing includes at least one linear portion and at least one curved portion.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Energy is transmitted horizontally through an RF conductor and upwardly through a waveguide via first and second wings. The first wing transfers energy from the RF conductor to the waveguide. The waveguide includes a first aperture through which the energy is transmitted vertically.

A metal layer is disposed vertically below a layer including the RF conductor and the first wing. The metal layer includes a second aperture that is at least partially aligned with the first aperture. The second wing forms a portion of the second aperture. The second wing is asymmetric relative to the first wing. The first wing extends toward a first side of the first and second apertures. The second wing extends toward a second side of the first and second apertures that is opposite the first side. The second wing extends further toward the first side than a closest portion of the RF conductor. The second wing maintains impedance matching, even with some misalignment during manufacturing.

Figure 1:
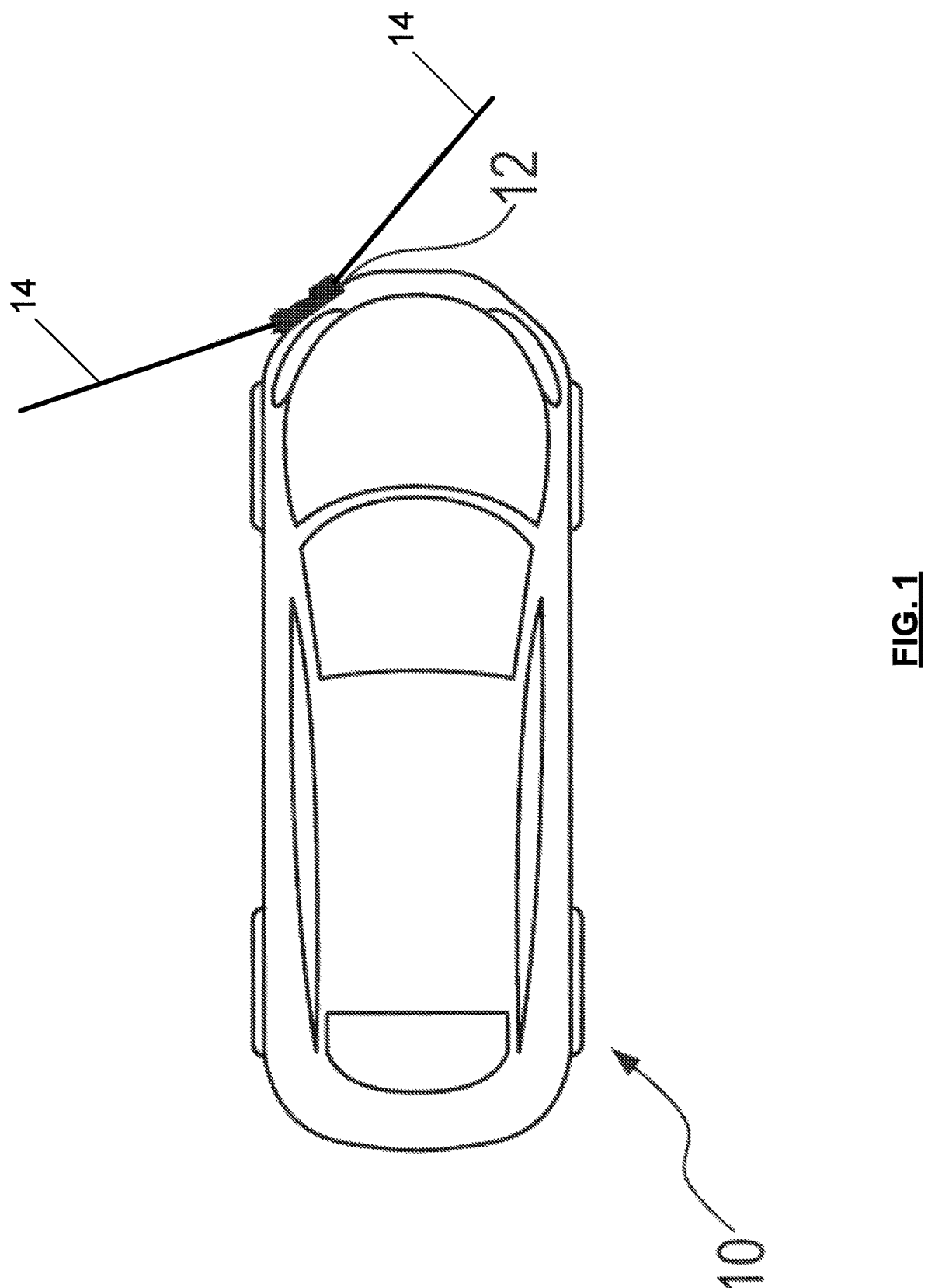
FIG. 1 is a top view of an example vehicle including a radar sensor for sensing features outside of the vehicle.

FIG. 1 includes a top view of an example vehicle 10. A radar sensor 12 is mounted at the left side of the front bumper of the vehicle 10. The radar sensor 12 includes a horizontal field of view indicated by 14 and a vertical field of view. The radar sensor 12 is configured to scan the field of view around the vehicle. Locations of objects within the field of view may be detected based on the scans.

While the example of the radar sensor 12 being mounted at the left side front bumper of the vehicle 10 is provided, the vehicle 10 may include one or more other radar sensors. The present application is applicable to radar sensors located at other locations of the vehicle.

Figure 2:
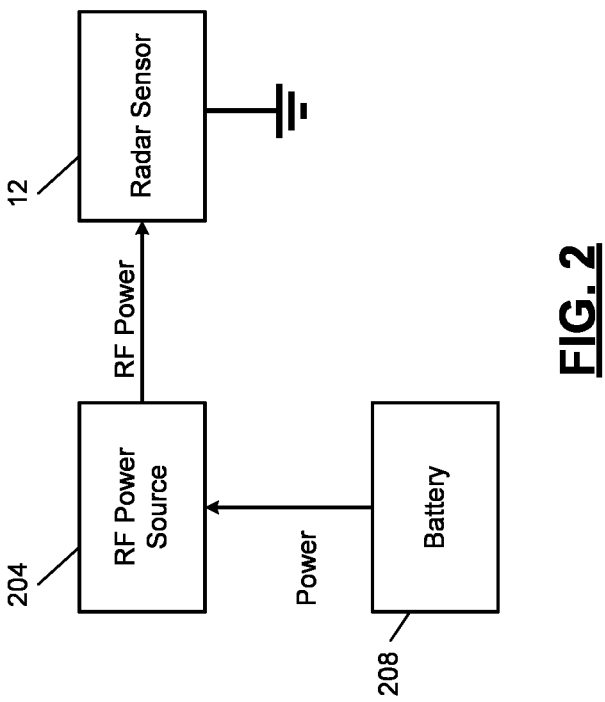
FIG. 2 includes a functional block diagram of an example radar sensor system of the vehicle.

FIG. 2 includes a functional block diagram of an example radar sensor system of the vehicle 10. A radio frequency (RF) power source 204 applies RF power to an RF feed of the radar sensor 12. The RF feed of the radar sensor 12 is discussed further below. Another portion of the radar sensor 12 is connected to a ground potential.

The RF power source 204 generates the RF power from power (e.g., alternating current (AC) or direct current (DC)) received from another source, such as a battery 208 of the vehicle 10.

In the radar sensor 12, an RF feed transitions between a microstrip printed circuit board (PCB) single-input MMIC and a waveguide antenna. The radar sensor 12 may have an antipodal feed design including a substrate and metal layers above and below the substrate. The top layer may be connected to the RF feed and includes a radiating wing that transitions z-plane electric fields (e-fields) to x-plane to match waveguide fields. The bottom layer also includes a wing that extends in the negative x direction (opposite the radiating wing) and is connected to the ground potential.

Manufacturing may include positioning the substrate on the bottom metal layer and positioning the top layer on the substrate. However, the top and bottom metal layers may not be aligned in the x direction, such as due to manufacturing tolerances.

Figure 3:
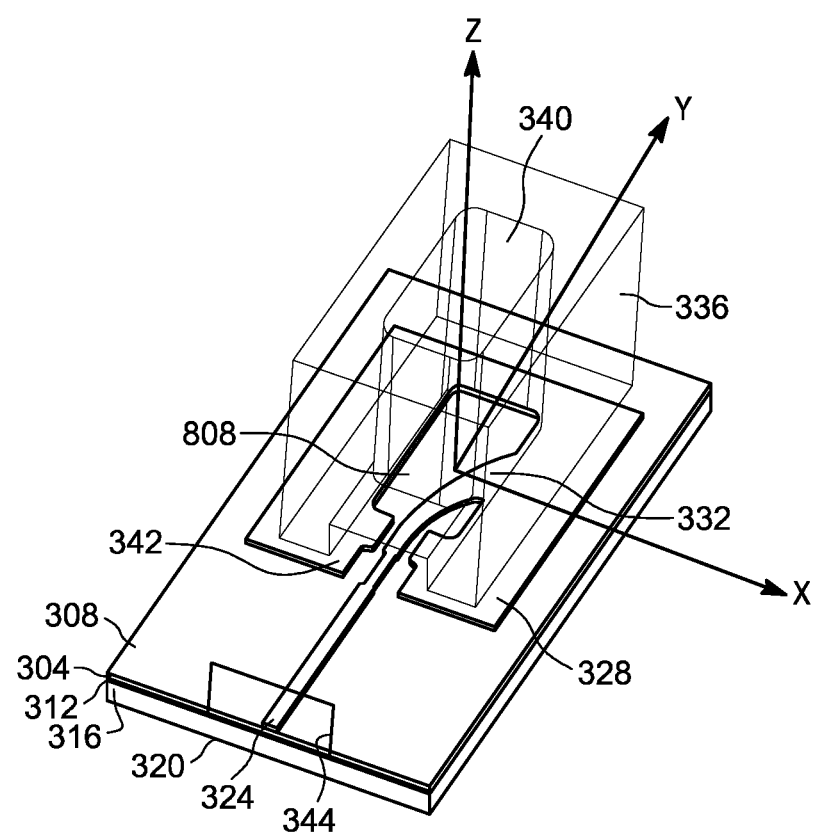
FIG. 3 includes a front side perspective view of an example implementation of a portion of the radar sensor including a waveguide to monolithic microwave integrated circuit (MMIC) with an upward vertical transition.
Figure 4:
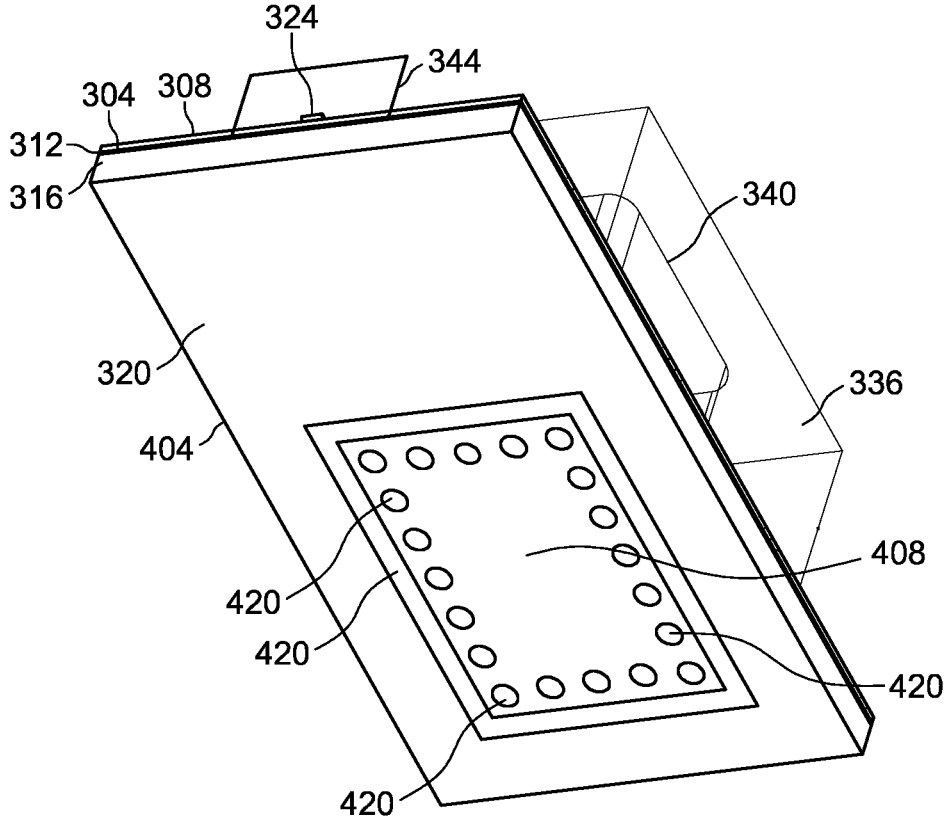
FIG. 4 includes a bottom side perspective view of the example portion of FIG. 3.
Figure 5:
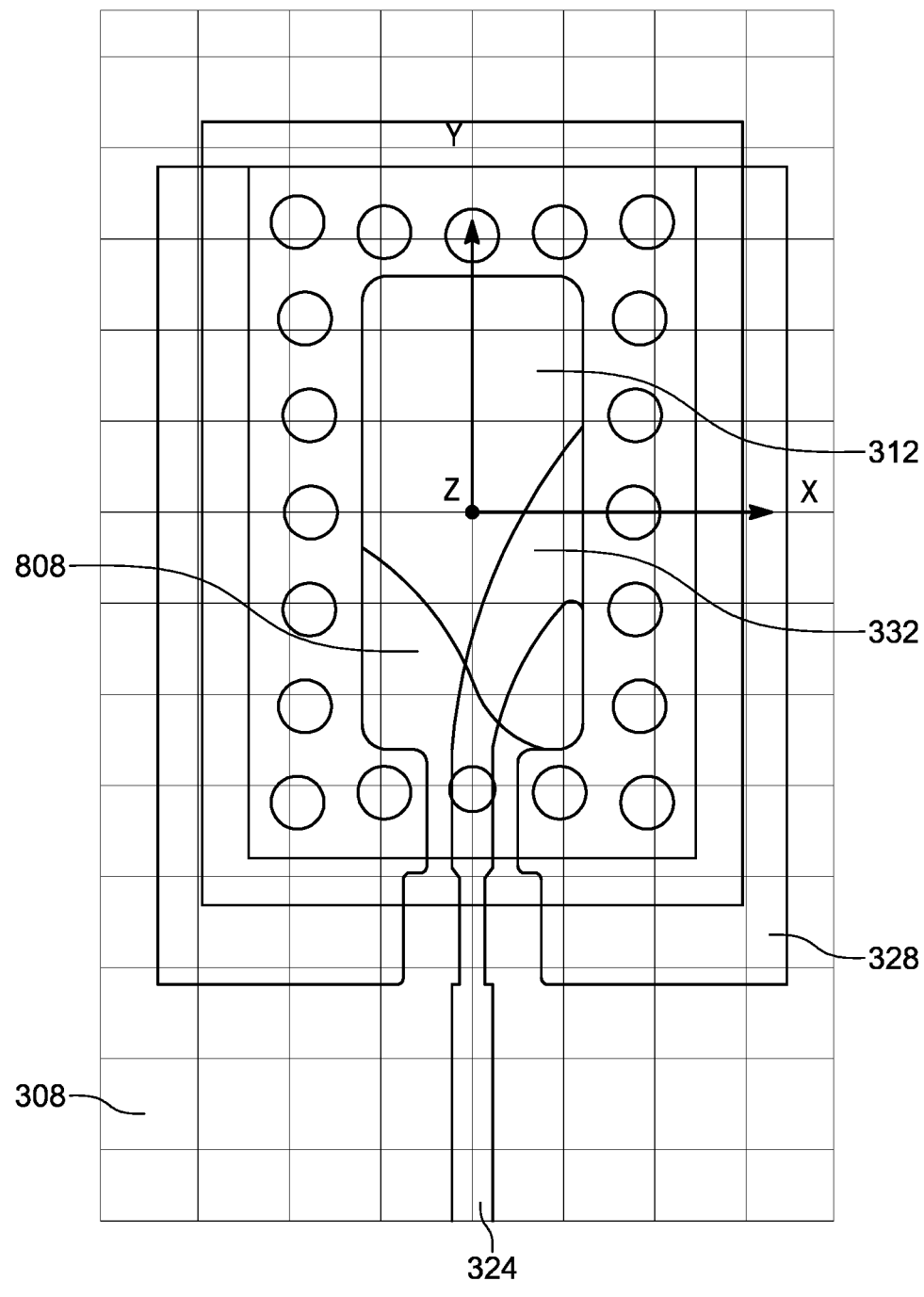
FIG. 5 includes a bottom perspective view of the example portion of FIG. 3.
Figure 6:
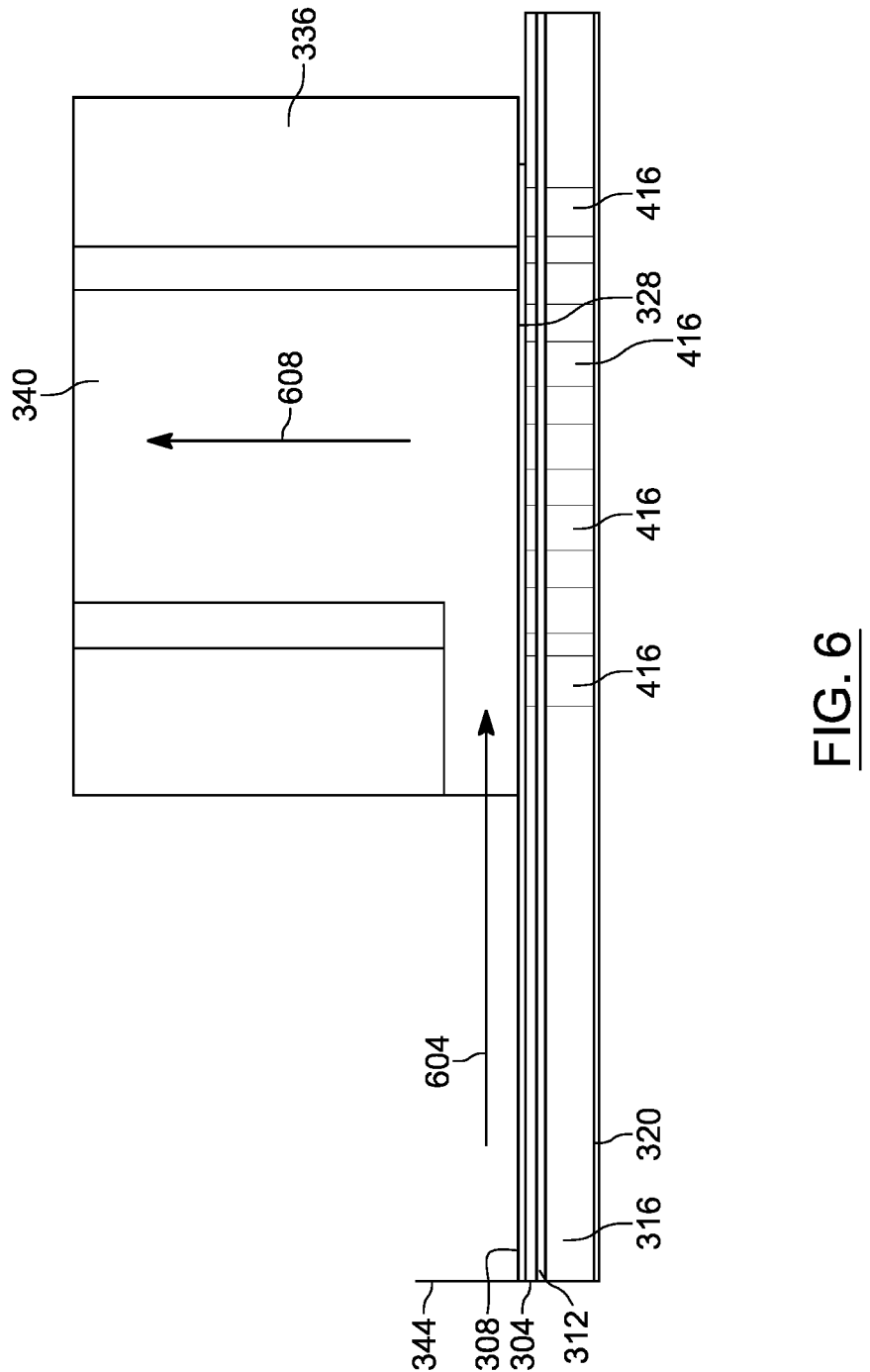
FIG. 6 includes a side cross-sectional view of the example portion of FIG. 3.

FIG. 3 includes a front side perspective view of an example implementation of a portion of the radar sensor 12 including a waveguide to monolithic microwave integrated circuit (MMIC) with an upward vertical transition. FIG. 4 includes a bottom side perspective view of the example portion of FIG. 3. FIG. 5 includes a bottom perspective view of the example portion of FIG. 3. FIG. 6 includes a side cross-sectional view of the example portion of FIG. 3.

Referring to FIGS. 3-6, a first substrate 304 is disposed between a first (e.g., top) metal layer 308 and a second (e.g., middle) metal layer 312. The first substrate 304 may be, for example, a PCB, a substrate including silicon, or another suitable substrate. The metal of the first and second layers 308 and 312 may be, for example, copper, aluminum, or another suitable electrically conductive material.

A second substrate 316 is disposed between the second metal layer 312 and a third (e.g., bottom) metal layer 320. The second substrate 312 may be, for example, a PCB, a substrate including silicon, or another suitable substrate. The metal of the third metal layer 320 may be, for example, copper, aluminum, or another suitable electrically conductive material.

An RF feed conductor 324 is disposed on a first surface of the first metal layer 308. The first surface is opposite a second surface of the first metal layer 308 that faces the first substrate 304. The RF feed conductor 324 is to be connected to the output of the RF supply 204. The RF feed conductor 324 is connected to a waveguide interface 328 via a wing 332. The RF feed conductor 324, the waveguide interface 328, and the wing 332 are made of an electrically conductive material, such as copper or aluminum, and may be one monolithic piece. The wave guide interface 328 may be generally C-shaped, and the RF feed conductor 324 extends through the opening in the C-shape. The direction that the wing 332 turns from the RF feed conductor 324 toward the waveguide interface 328 will be referred to herein as an X direction, such as illustrated in FIG. 3. A Y direction is perpendicular to the X direction and a Z direction, and the Y direction extends in the same direction as the RF feed conductor 324. The Z direction is perpendicular to both the X direction and the Y direction. Positive values of each direction may be in the direction of the arrows illustrated in FIG. 3. Negative values of each direction may be in the opposite direction of the arrows illustrated in FIG. 3.

A waveguide 336 sits upon the waveguide interface 328. The waveguide 336 may be made of an electrically conductive material, such as aluminum, copper, or another suitable electrically conductive material. In various implementations, the waveguide 336 may include a core, and the electrically conductive material may be disposed (e.g., coated) on and cover outer surfaces of the waveguide 336. The core may be made of, for example, a plastic.

The waveguide 336 includes an aperture 340 that may be referred to as a waveguide output port. An axis of the aperture 340 may be aligned with a center of the opening of the C-shape of the waveguide interface 328. Origins (0 points) of the X, Y, and Z directions may be at the center of the opening of the C-shape. The Z direction may be coaxial with the axis of the aperture 340. The aperture 340 may be, for example, rectangular or have another suitable shape. In various implementations, corners of the aperture may be rounded, such as illustrated in the example of FIG. 3.

The waveguide 336 may also include a second aperture 342 that fluidly connects with the aperture 340. The RF conductor 324 extends through the second aperture 342. The second aperture 342 prevents the RF conductor 324 and the wing 332 from directly contacting the waveguide 336. Instead, the C-shape the waveguide interface 328 directly contacts the waveguide 336.

In various implementations, an encapsulating material, such as a dielectric material, may cover the first surface of the first metal layer 308, the RF conductor 324 and the waveguide interface 328, and the waveguide 336, and fill the first aperture 340. In various implementation, an aperture 344 may be formed through the encapsulating material to and through the second aperture 342. In various implementations, the first aperture 340 may be filled with air.

As shown in FIG. 4, the third metal layer 320 may include a first metal layer portion 404 and a second metal layer portion 408. The third metal layer 320 may includes a removed portion 412 that electrically isolates the first metal layer portion 404 from the second metal layer portion 408. When looking toward the third metal layer 320, the removed portion 312 may make the second substrate 316 visible between the first and second metal layer portions 404 and 408. The first metal layer portion 404 may be electrically connected to the ground potential. The second metal layer portion 408 may also be electrically connected to the ground potential.

As illustrated in FIGS. 4, 5, and 6, electrically conductive vias 416 electrically connect the second metal layer portion 408 to the second metal layer 312. The electrically conductive vias 416 include an electrically conductive material, such as aluminum, copper, or another suitable electrically conductive material. The electrically conductive vias 416 extend through the second substrate 316 to directly contact the second metal layer 312 and the second metal layer portion 408. The electrically conductive vias 416 may be referred to as fences.

Figures 7, 8:
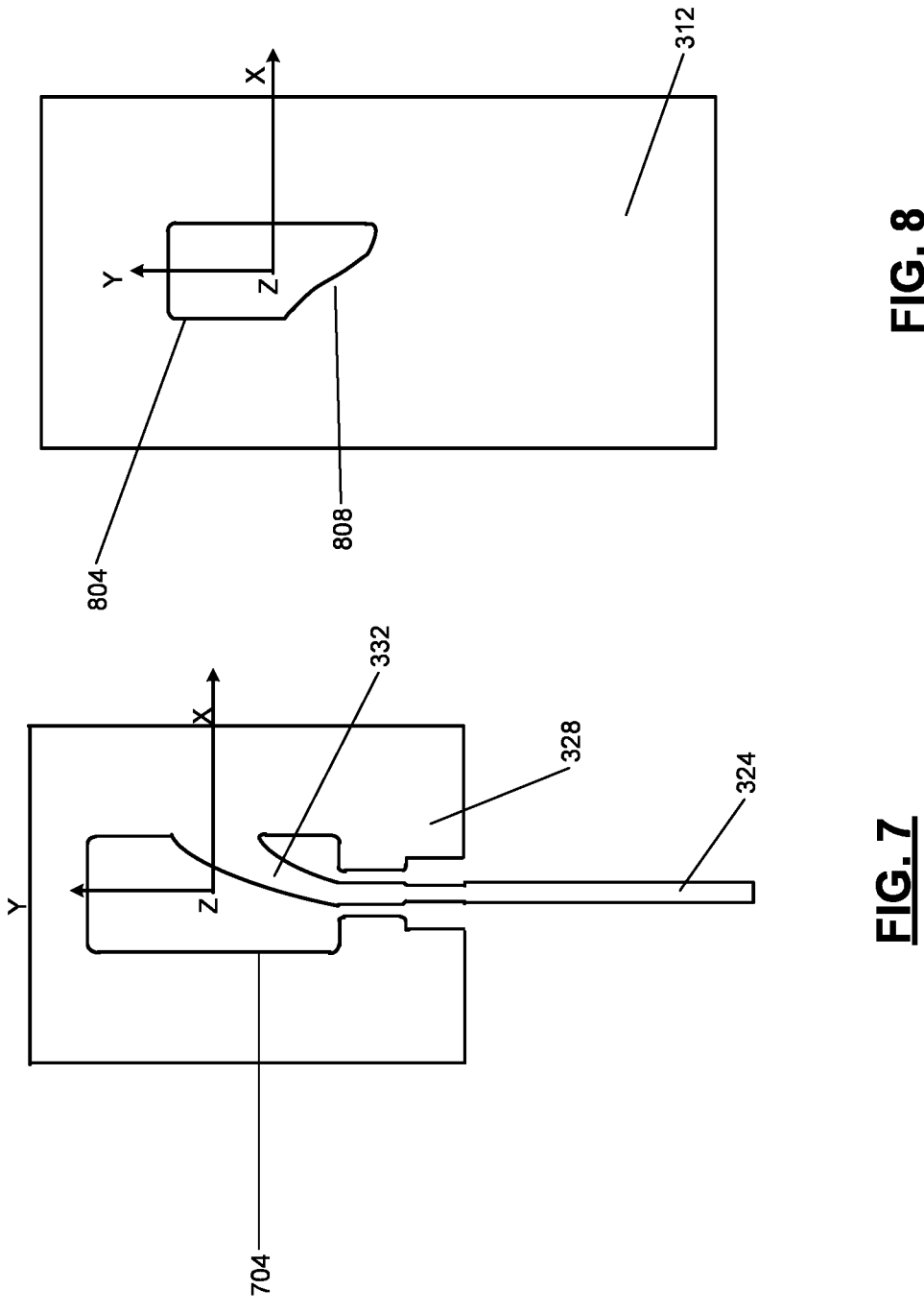
FIG. 7 includes an example illustration of a radio frequency (RF) conductor, a wing, and a waveguide interface.
FIG. 8 includes an example illustration of a metal layer with a second wing.

FIGS. 3, 5, and 8 include example illustrations of the second metal layer 312. FIG. 7 includes an example illustration of the RF conductor 324, the wing 332, and the waveguide interface 328. As illustrated in FIG. 7, the waveguide interface 332 includes an aperture 704 that is aligned (e.g., coaxially) with the aperture 340 through the waveguide 336. The wing 332 is at least partially disposed within the aperture 704.

The second metal layer 312 also includes an aperture 804 that is aligned (e.g., coaxially) with the aperture 340 through the waveguide 336 and the aperture 704. The second metal layer 312 includes a second wing 808 that extends in the opposite direction (−X direction) as the wing 332 (which extends in the +X direction). The wing 332 and the second wing 808 are tapered, which provides a broadband frequency response. The shape of the wings 332 and 808 and how the wing 332 vertically overlaps the second wing 808 controls impedance matching.

Figure 12:
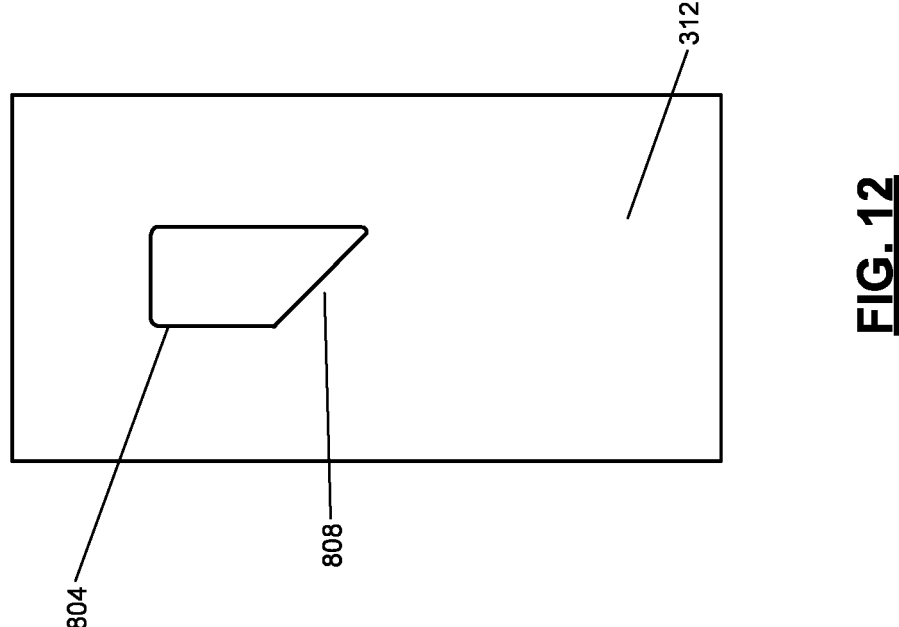
FIGS. 12-14 are example top view illustrating the RF feed, the wing, and the waveguide interface vertically overlaying a second metal layer including an example implementation of a second wing.
Figure 13:
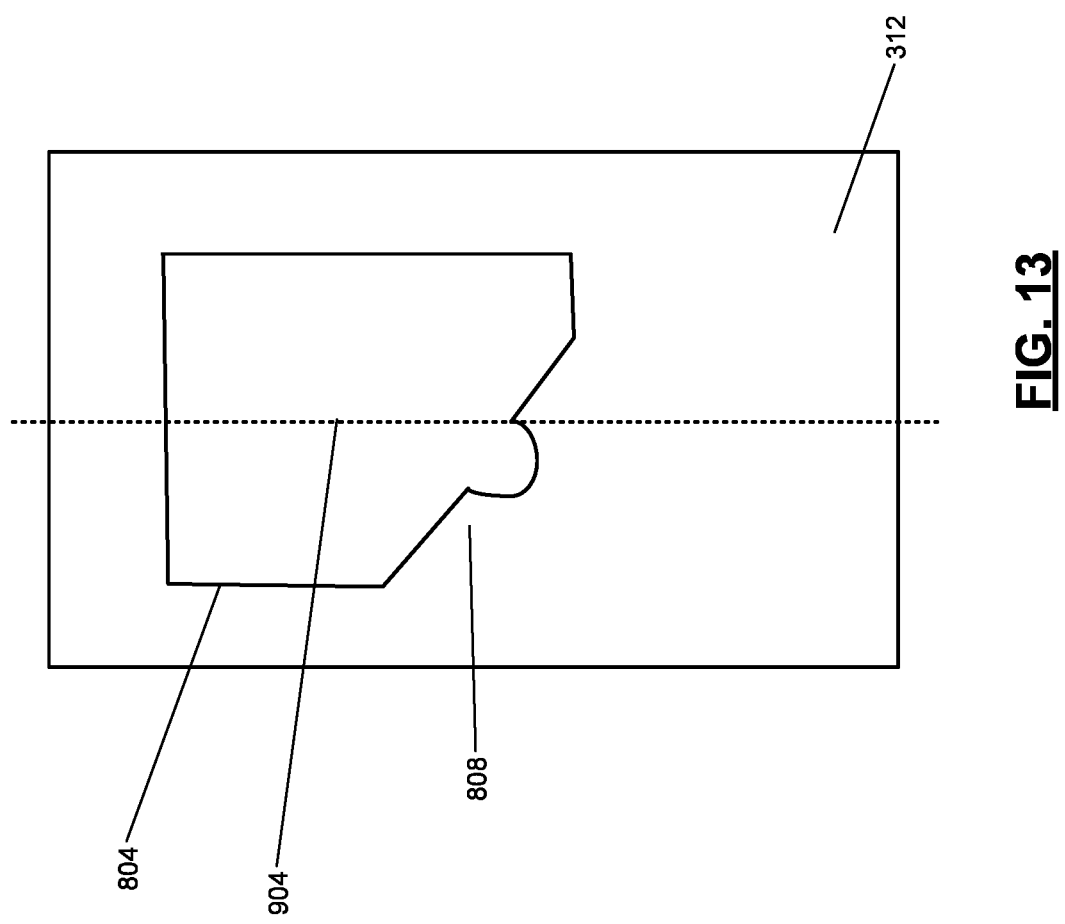
Figure 14:
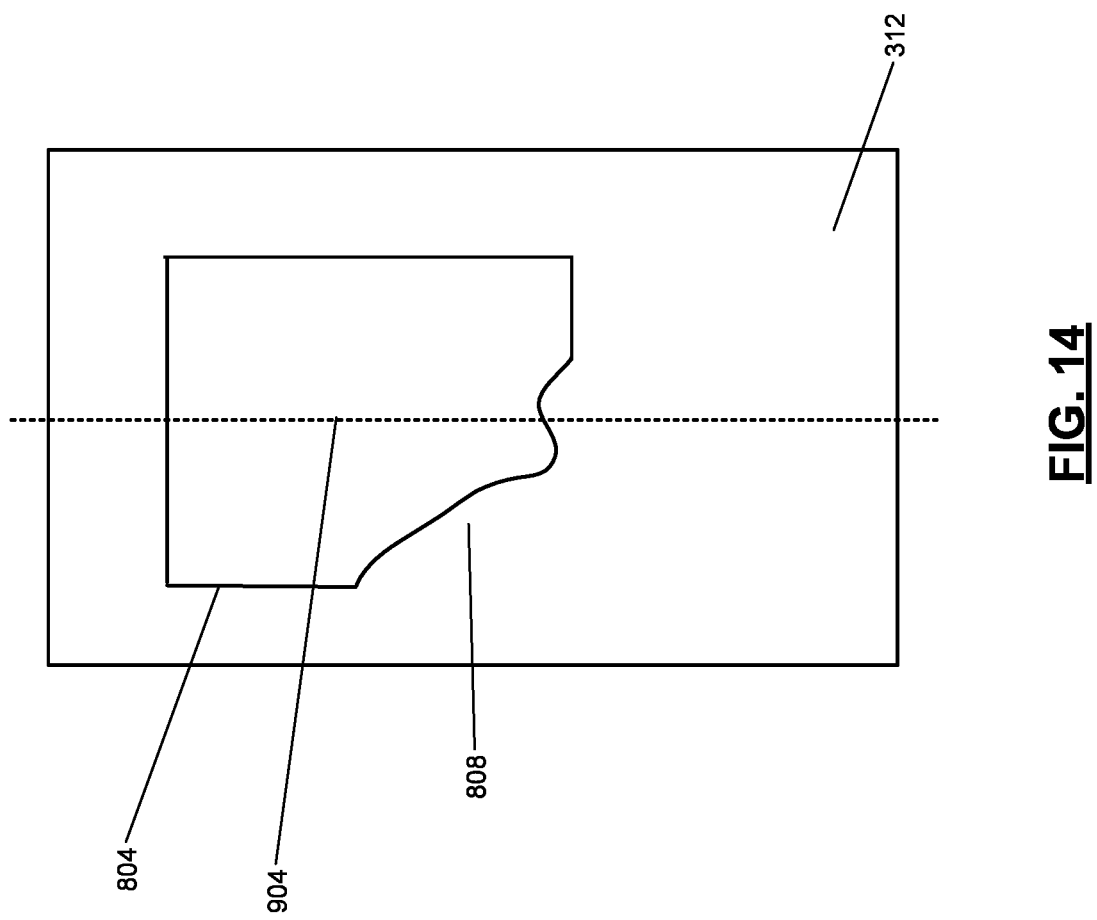

The second wing 808 is asymmetrical to the wing 332. The second wing 808 may include at least one concave portion and at least one convex portion, such as illustrated in FIG. 8. The second wing 808 may include a serpentine design including two or more curves in different directions, such as illustrated in FIG. 8. Alternatively, the second wing 808 may be formed by a linear portion, such as illustrated in the example of FIG. 12. In various implementations, the second wing 808 may include one or more linear portions and one or more curves in one or more different directions. FIGS. 13 and 14 include example illustrations of the second wing 808 including at least one linear portion and at least one curved portion.

The shape and dimensions of the second wing 808 provide impedance matching even with possible mis-alignment of the first metal layer 308 and the second metal layer 312 in the +X direction or the −X direction, such as during manufacturing despite being within target tolerances.

As illustrated in FIG. 6 by 604, the energy is transmitted from the RF feed 324 inward toward the aperture 340. The energy is transmitted upward as illustrated by 608. The dielectric material within the aperture 340 reflects back downward electromagnetic waves. The waveguide 336 guides energy upward toward one or more antennas of the radar sensor 12.

Figure 9:
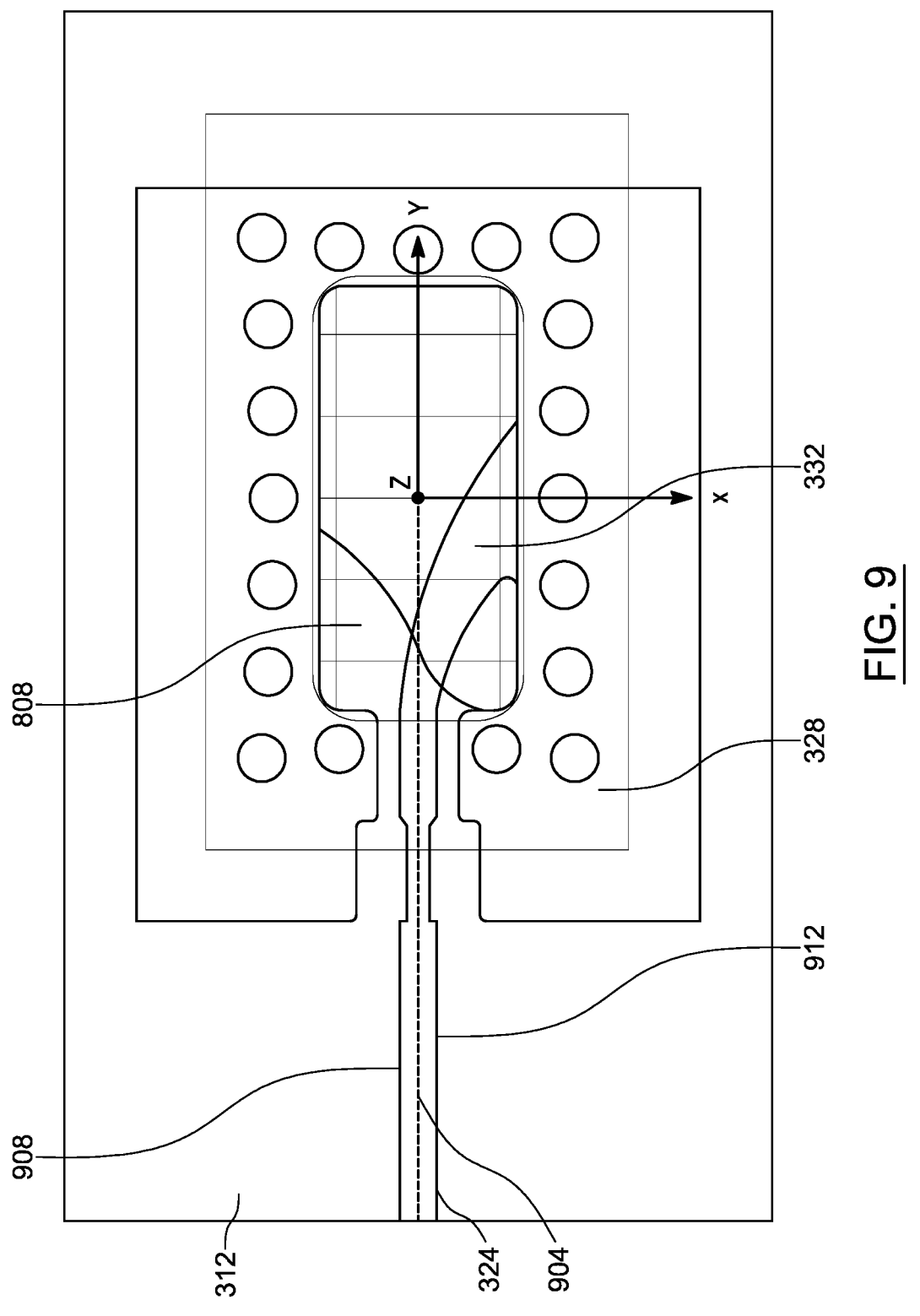
FIG. 9 is an example top view illustrating the RF feed, the wing, and the waveguide interface vertically overlaying a second metal layer including an example implementation of a second wing.

FIG. 9 is an example top view illustrating the RF feed 324, the wing 332, and the waveguide interface 328 vertically overlaying the second metal layer 312 including an example implementation of the second wing 808.

A centerline 904 of the RF feed 324 may be coaxial with the Y direction axis. The RF feed 324 has a width in the X direction such that a first side 908 of the RF feed 324 is disposed in the −X direction relative to a second side 912 of the RF feed 324 that is opposite the first side.

The second wing 808 of the second metal layer 312 extends in the positive X direction past the second side 912 of the RF feed 324, such as illustrated in FIG. 3. The second wing 808 may extend in the positive X direction past the second side 912 of the RF feed 324 by at least a predetermined manufacturing tolerance in the X direction, such as 0.1 millimeters (mm) or another suitable distance.

The second wing 808 could alternatively be symmetrical with the wing 332 and mirrored (e.g., turning in the −X direction) with the only overlap being at the RF feed 324. However, impedance mismatching may occur due to manufacturing misalignment in the X direction, despite being within manufacturing tolerances. The second wing 808 being asymmetric relative to the wing 332 provides additional resistance to X direction misalignment and improves impedance matching despite misalignment.

Figure 10:
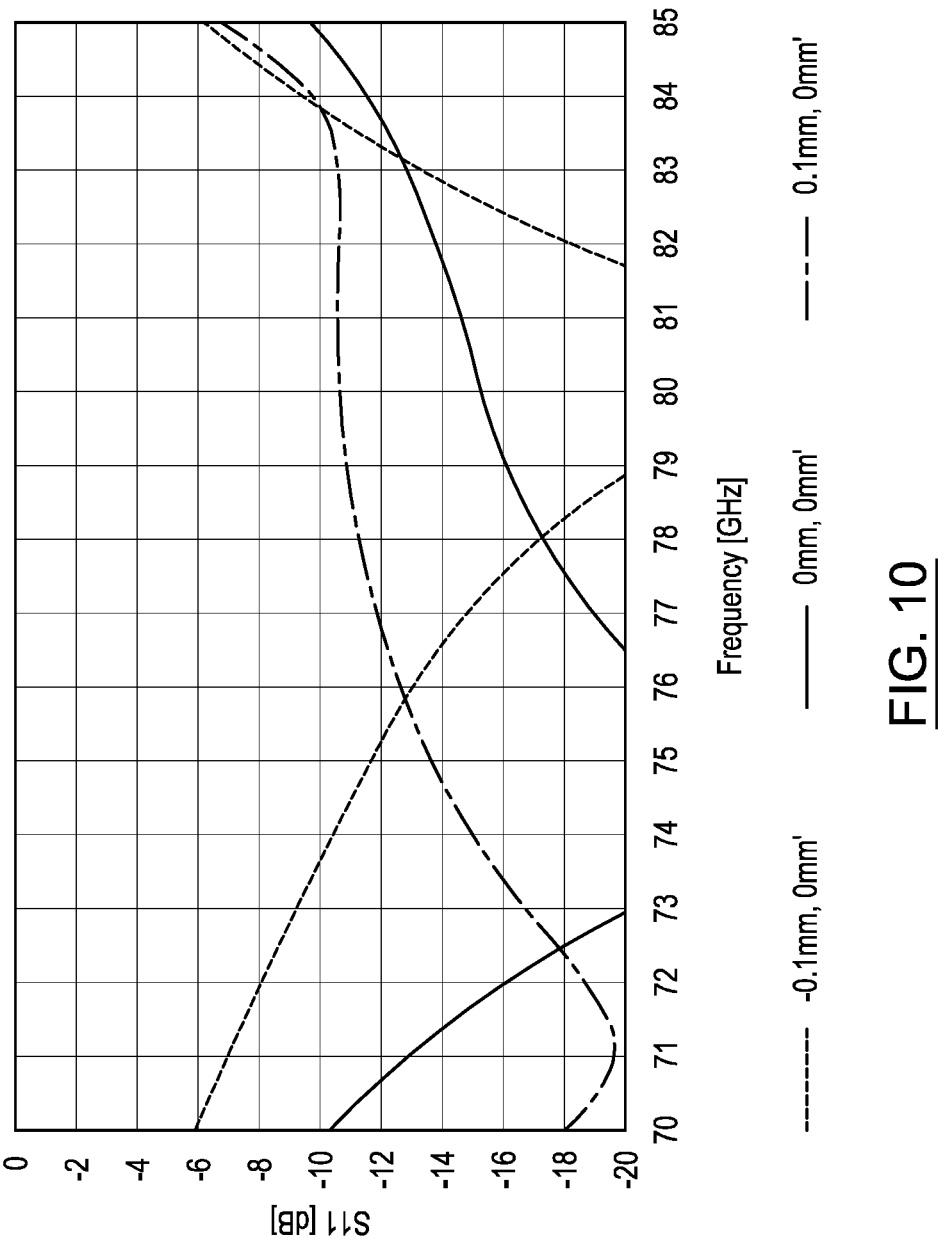
FIGS. 10-11 are example graphs of S11 versus frequency at different amounts of X direction displacement.

FIG. 10 includes an example graph of S11 (reflection coefficient or matching) tolerance for an example where the second wing 808 is symmetrical with the wing 332 and mirrored with the only vertical overlap being at the RF feed

324. The different traces illustrated different distances of misalignment in the X direction.

Figure 11:
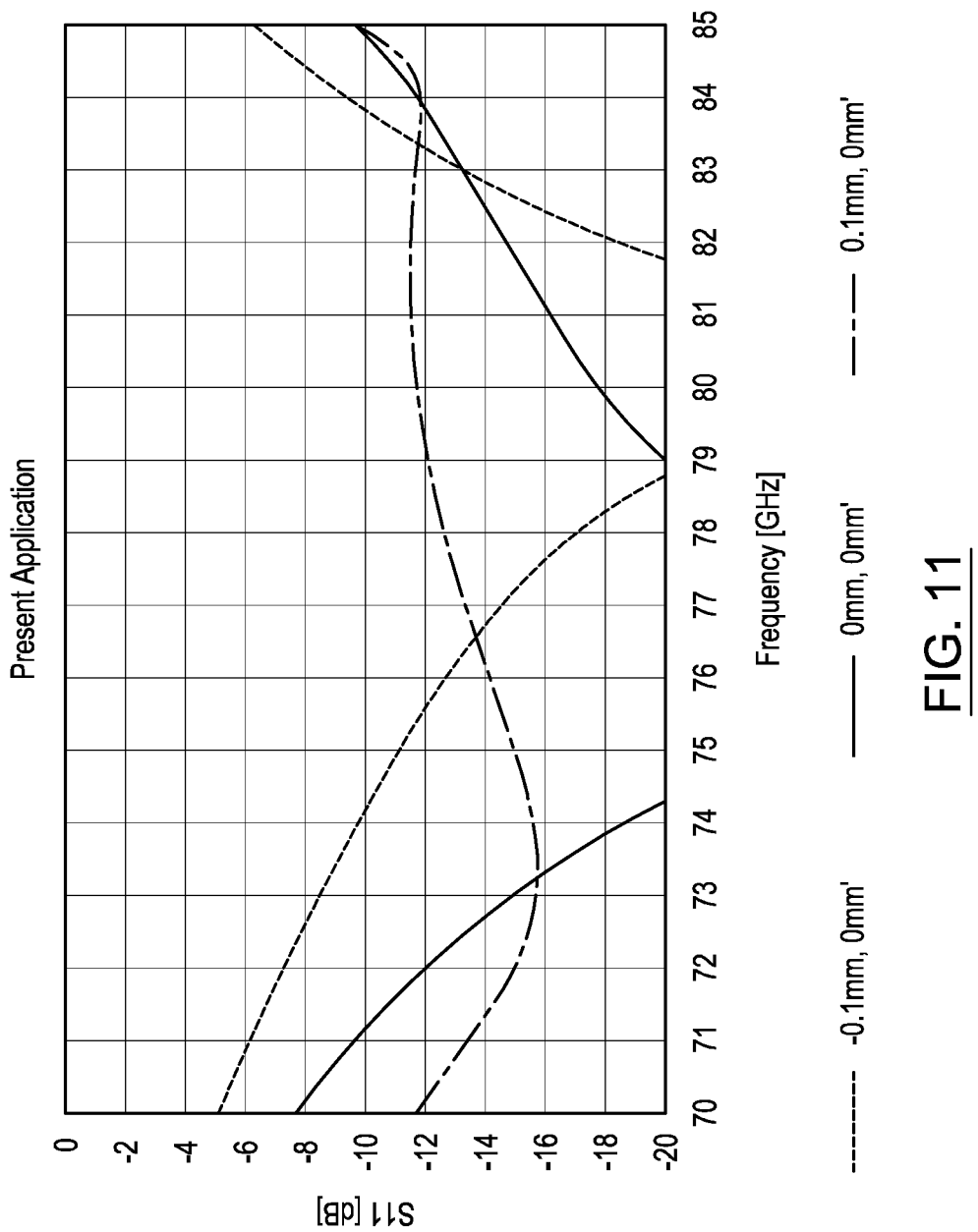

FIG. 11 includes an example graph of S11 (reflection coefficient or matching) tolerance for an example where the second wing 808 is asymmetrical with the wing 332 as described above and extends in the X direction past the second side 912 of the RF feed 324. The different traces illustrated different distances of misalignment in the X direction.

As can be seen by comparing FIG. 11 with FIG. 10, the design of the second wing 808 described herein decreases S11 degradation across the frequency range. Similar results are also true for decreased insertion loss (S21).

The design of the second metal layer 312 as described herein provides a more gradual electrical field transition to the waveguide 336 despite possible misalignment in the X direction. This results in better performance across a target frequency range of the radar sensor 12.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C." The drawings may be to scale.

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

What is claimed is:

1. A radar sensor comprising:
   a waveguide interface that is electrically conductive, that is configured to contact a waveguide, and that includes a first aperture that is at least partially vertically aligned with a second aperture in the waveguide;
   a radio frequency (RF) feed that is electrically conductive;
   a first wing that is coplanar with the RF feed and the waveguide interface and that electrically connects the RF feed with the waveguide interface;
   a first electrically conductive layer that is electrically connected to a ground potential, that includes a third aperture that is at least partially aligned with the first and second apertures, and that includes a second wing that forms a portion of the third aperture,
   wherein the first wing extends away from a line through an axis of the RF feed in a direction toward a first surface of the first aperture, and
   wherein the second wing:
       extends away from the line toward a second surface of the first aperture that is opposite the first surface; and
       extends from the second surface further toward the first surface than a closest side of the RF feed to the first surface.

2. The radar sensor of claim 1, wherein the first wing and the second wing are asymmetrical.

3. The radar sensor of claim 1, wherein the first wing includes a tapered portion.

4. The radar sensor of claim 3, wherein the tapered portion incudes at least one curve.

5. The radar sensor of claim 1, wherein the second wing includes a convex portion and a concave portion.

6. The radar sensor of claim 1, wherein the second wing includes at least two curved portions.

7. The radar sensor of claim 1, wherein the second wing includes a linear portion that extends between the second surface toward the first surface to a point that is closer to the first surface than the closest side of the RF feed.

8. The radar sensor of claim 1, further comprising a substrate and a second electrically conductive layer disposed on a first surface of the substrate,
   wherein the RF feed, the first wing, and the waveguide interface directly contact the second electrically conductive layer, and
   wherein the first electrically conductive layer contacts a second surface of the substrate that is opposite the first surface.

9. The radar sensor of claim 1, further comprising the waveguide.

10. The radar sensor of claim 9, wherein the waveguide includes an electrically conductive material on exterior surface of the waveguide.

11. The radar sensor of claim 9, further comprising an electrically insulative material disposed within the second aperture.

12. The radar sensor of claim 1, wherein the waveguide interface includes a C-shape and the RF feed extends into an opening in the C-shape.

13. The radar sensor of claim 12, wherein the first aperture is within the C-shape.

14. The radar sensor of claim 1, further comprising electrically conductive vias that electrically connect the first electrically conductive layer to the ground potential.

15. The radar sensor of claim 14, further comprising a third electrically conductive layer that is electrically connected to the ground potential, wherein the electrically conductive vias electrically connect the first electrically conductive layer to the third electrically conductive layer.

16. The radar sensor of claim 15, wherein the third electrically conductive layer includes a first electrically conductive portion, a second electrically conductive portion, and an electrically insulative portion that electrically isolates the first electrically conductive portion from the second electrically conductive portion.

17. The radar sensor of claim 16, wherein the first electrically conductive portion is disposed within the second electrically conductive portion, and wherein the electrically conductive vias electrically connect the first electrically conductive layer to the first electrically conductive portion.

18. The radar sensor of claim 15, further comprising a second substrate disposed between the first electrically conductive layer and the third electrically conductive layer.

19. The radar sensor of claim 1, wherein the line through the axis of the RF feed is perpendicular to second axes of the first and second apertures.

20. The radar sensor of claim 1, wherein the second wing includes at least one linear portion and at least one curved portion.

\* \* \* \* \*